(12) United States Patent
Li et al.

(10) Patent No.: US 6,937,641 B2
(45) Date of Patent: Aug. 30, 2005

(54) POWER-CONTROLLED RANDOM ACCESS

(75) Inventors: Don Li, Morganville, NJ (US); Gang Yang, Eatontown, NJ (US)

(73) Assignee: Golden Bridge Technology, Inc., West Long Branch, NJ (US)

( * ) Notice: Subject to any disclaimer, the term of this patent is extended or adjusted under 35 U.S.C. 154(b) by 569 days.

(21) Appl. No.: 10/083,687

(22) Filed: Feb. 27, 2002

(65) Prior Publication Data

US 2003/0026324 A1 Feb. 6, 2003

Related U.S. Application Data

(60) Provisional application No. 60/271,721, filed on Feb. 28, 2001.

(51) Int. Cl.$^7$ .......................... H04K 1/00; H04B 1/707
(52) U.S. Cl. ...................................... 375/141; 370/342
(58) Field of Search ................................. 375/130, 140, 375/141, 297; 370/320, 335, 342; 455/13.4, 500, 515, 522

(56) References Cited

U.S. PATENT DOCUMENTS

| | | | |
|---|---|---|---|
| 5,604,730 A | | 2/1997 | Tiedemann, Jr. |
| 5,940,743 A | * | 8/1999 | Sunay et al. .................. 455/69 |
| 6,072,784 A | * | 6/2000 | Agrawal et al. ............. 370/311 |
| 6,169,759 B1 | | 1/2001 | Kanterakis et al. |
| 6,304,562 B1 | | 10/2001 | Kim et al. |
| 6,317,587 B1 | | 11/2001 | Tiedemann, Jr. et al. |
| 6,324,209 B1 | | 11/2001 | Li et al. |
| 6,334,047 B1 | * | 12/2001 | Andersson et al. ............ 455/69 |
| 6,434,130 B1 | * | 8/2002 | Soininen et al. ............ 370/331 |
| 6,498,785 B1 | * | 12/2002 | Derryberry et al. ......... 370/311 |
| 6,512,931 B1 | * | 1/2003 | Park et al. ................... 455/522 |
| 6,628,956 B2 | * | 9/2003 | Bark et al. .................. 455/522 |
| 6,757,319 B1 | * | 6/2004 | Parsa et al. ................. 375/141 |
| 6,757,537 B1 | * | 6/2004 | Choi et al. .................. 455/438 |
| 6,829,226 B1 | * | 12/2004 | Apostolides et al. ....... 370/318 |

FOREIGN PATENT DOCUMENTS

| | | |
|---|---|---|
| WO | 00/03499 | 1/2000 |
| WO | 01/39416 A1 | 5/2001 |
| WO | 01/39452 A1 | 5/2001 |
| WO | 01/59968 A1 | 8/2001 |

* cited by examiner

*Primary Examiner*—Young T. Tse
(74) *Attorney, Agent, or Firm*—McDermott Will & Emery LLP

(57) ABSTRACT

A novel power-controlled random-access method allows a mobile station to gain fast access to the base station. At the mobile station, a composite power control command is devised after an initial access attempt. The determination of the composite command uses an open-loop power-control symbol and a closed-loop power-control symbol, to decide the action of the mobile station upon transmission of its next random-access signal. In the preferred embodiment, the composite power control command can specify different levels of increase or decrease in transmission power, and the composite power control command can specify a back-off by the mobile station. This composite power-control mechanism can help resolve collision between mobile stations accessing the same random access sub-channel and therefore maintain a low-delay in the random-access process and a high-utilization on the access-channel resource.

16 Claims, 7 Drawing Sheets

POWER-CONTROLLED RANDOM ACCESS

RELATED APPLICATION

This application claims the benefit of U.S. Provisional Application No. 60/271,721, entitled "POWER-CONTROLLED RANDOM ACCESS" filed on Feb. 28, 2001, the disclosure of which is entirely incorporated herein by reference.

FIELD OF INVENTION

This invention relates to spread-spectrum communications, and more particularly to code-division-multiple-access (CDMA) cellular, packet-switched systems. The inventive concepts involve use of a composite power-control command to adjust the direction and amount of change in transmission power of a next random access signal, to resolve collision between mobile stations and provide a mechanism for colliding or fading mobile stations to back-off.

BACKGROUND

A CDMA-based random access channel (RACH) provides a common uplink packet transport from a mobile station (MS) to a base station (BS). The RACH is typically composed of many sub-channels defined by preamble code sequences over a well-defined timeslot (RACH sub-channels). Typically, there are a number of base stations and a plurality of mobile stations. Each MS has a transmitter and receiver. An uplink (UL) is from the MS to the BS. A downlink (DL) is from the BS to the MS. The BS broadcasts common messages and control signals to a plurality of mobile stations through the DL broadcast and control channel (BCCH), typically embedded in a broadcast, paging and common-control channel (BPCCH). The broadcast message on the BCCH channel contains information such as the available random-access preamble codes, their associated timeslots (i.e., the RACH sub-channels), ACK messages, etc.

The channel resource allocation of RACH is contention based. A simplified example of the signals exchanged between an MS and a BS for a RACH service follows. An MS listens to the message on the BCCH channel and transmits one or more random access signals over an uplink physical common channel, in access slots defined in relation to a frame-timing signal derived from receipt of the common synchronization channel. The random access signal contains a preamble code corresponding to a RACH sub-channel. When the BS receives a random access signal at an adequately detectable power level, it transmits back an acknowledgement (ACK), containing a code that corresponds to the access preamble code.

If the MS does not receive an acknowledgement with a set time; it retransmits its access attempt signal, at an increased power level. The MS ceases transmission of the random access signals when it receives the corresponding ACK signal from the base station. If the MS successfully receives the acknowledgement corresponding to the access preamble code that it transmitted, the MS proceeds to the next phase in the transmission process, referred to generally as transmission of data over a dedicated timeslot in an uplink data channel.

Alternatively, the MS will cease transmission of random access signals if it has transmitted the maximum allowed number of random access signals (i.e. time-out) or if it has received a negative acknowledge (NACK) from the BS. The MS assumes that its access attempt has failed, so it backs off and waits for some period of time before initiating another access attempt.

Since multiple mobile stations may be accessing the BS at the same time, they may be simultaneously generating increasingly powerful and interfering transmissions, which is undesirable. Various methods of power control were developed to reduce the excessive signal power.

Published International application WO00/03499 (Kim et al.) teaches a transmission preamble power control methodology to slowly adjust the transmission power of the access preamble, based on the combination of a closed-loop power control bit and an open-loop power control bit. In the disclosed access method, the mobile station periodically transmits a preamble signal, and each transmission uses an increased power. Upon receipt of an acknowledgement from the base station, the mobile station accesses the reverse common channel. During the access procedure, the mobile station measures the strength of a signal received from the base station and generates an open loop power control signal. The mobile station also receives a power control bit in each of a series of transmissions over the forward channel. The mobile station accumulates the received signal strength measurement and the received power control bits over time, and it uses those two accumulated signals to control the transmission power of the preamble signal. With this approach, the open-loop power control bit only conveys two kinds of information on the power control, power-up or power-down. The closed-loop power control bit only commands power-down on the transmitted preamble signal. It does not command power-up. Therefore the resulting transmission preamble power control signal does not reveal how much the power should be adjusted on the transmitted preamble signal, for any particular instant or transmission cycle. Also, this control technique requires time to accumulate the necessary control information. While the aforementioned power control method may be sufficient in a long preamble ramp-up process, it is not adequate for a fast packet-access communications system to ensure high-throughput.

Also, in a high-capacity system, the random-access resource is very limited. For example, in a given system, there are up to 64 RACH sub-channels. But the actual number of RACH sub-channels in a basic frame that can be assigned by the BS depends on the load of the network. When there is a light load, up to or more than 64 RACH sub-channels can be assigned to mobile stations for reducing the wait-time of gaining access to the network. But when the network is heavily loaded, a minimum of up to 32 RACH sub-channels is assigned by the BS to reduce the load. For a given number of mobile stations attempting to access the network, the reduced number of sub-channels means that on average each individual mobile station will encounter a longer wait time before successfully accessing the network.

Hence, there is a need for a technique to achieve fast channel-access, without imposing access delays during initial power control.

SUMMARY

The inventive concepts alleviate the above noted problems with initial power control during the access phase in a wireless domain utilizing a random access procedure. The embodiments utilize an initial power estimation of the transmitted random-access signal for the first access attempt, and if that attempt is unsuccessful, the power for a subsequent attempt utilizes a combination of fast open-loop control and closed-loop power control.

Hence a general objective is to achieve power-controlled fast random-access by using a composite power control command to accurately adjust the amount of power needed for channel access on a subsequent attempt.

Another objective is to provide a mechanism to resolve collision between mobile stations.

Another objective is to provide a back-off mechanism for the disadvantaged mobile stations that encounter contention and control the back-off time to avoid the fade period of the radio channel in the subsequent random-access attempt.

Aspects of the invention relate to methods of wireless communication as well as communication equipment wherein a first random access attempt from a mobile station utilizes power control based on an initial estimate. If the first attempt is unsuccessful, power control for a second attempt to access the channel is responsive to a closed loop control symbol from the base station as well as an open loop control symbol developed by the mobile station itself. Each power control symbol, whether open or closed loop, specifies provides information as to extent or degree, for example of the amount that the respective power was over or under an optimum value. As such, each symbol separately provides sufficient information that the mobile can utilize to judge an appropriate amount of change if, i.e. more than just a power-up or power-down recommendation.

The actual transmission power, and in some cases the timing (back-off), of the subsequent access attempt is based on a combination of the two power control instructions. However, the mobile station need not wait to accumulate instructions to determine the appropriate power for each access attempt.

Method embodiments broadly described herein relate to improved methods of operations of a CDMA system that supports packet-switched communication or of a mobile station seeking to communicate via such a network. The CDMA system has a plurality of base stations and a plurality of mobile stations. For packet-switched based communication, the preferred network provides a plurality of uplink transport channels and a plurality of downlink control channels. In the presently preferred embodiment, one or more mobile stations receive a signal from the base station via a broadcast and common-control channel (BCCH). At a mobile station (MS), the steps include measuring the received signal from BCCH, computing an initial power required for channel access, and transmitting a random access signal at that power level. If no acknowledgement is received, the steps further include generating an open-loop power-control signal (OLPCS) and receiving a closed-loop power-control symbol (CLPCS) from the BCCH channel. Based on the OLPCS and the CLPCS, a composite power-control command is generated at the MS. The composite power-control command controls not only the course of action for the MS (e.g. to power up, power down, transmit at same power, or to back-off), but also the level of any change in transmission power of the next random access signal transmitted from the MS.

At the base station (BS), the steps include broadcasting common messages and control signals to a plurality of mobile stations through the downlink (DL) broadcast and control channel (BCCH). The BS also generates a CLPCS symbol for each RACH sub-channel and broadcasts it over the BCCH.

Other aspects of the invention relate to implementations of base stations and mobile stations, which take advantage of the inventive power control techniques.

The inventive power control technique admits of a wide range of variations and applications. For example, the preferred embodiments involve application to CDMA type wireless communications, particularly for RACH-based packet data services. The RACH terminology here means no more than a general random-access mechanism over a wireless channel. Examples include the RACH channel currently proposed in 3G W-CDMA standards. While the embodiments discussed below are particularly applicable to certain 4G wireless system implementations, as shown for example in the drawings, the inventive concepts also are directly applicable to other wireless communication systems including but not limited to any hybrid CDMA/TDMA system such as the TD-SCDMA (or WCDMA TDD). Clearly the invention may find application to packet data communications in other types of digital wireless networks.

Additional objects, advantages and novel features of the embodiments will be set forth in part in the description which follows, and in part will become apparent to those skilled in the art upon examination of the following and the accompanying drawings or may be learned by practice of the invention. The objects and advantages of the inventive concepts may be realized and attained by means of the instrumentalities and combinations particularly pointed out in the appended claims.

BRIEF DESCRIPTION OF THE DRAWINGS

The drawing figures depict preferred embodiments by way of example, not by way of limitations. In the figures, like reference numerals refer to the same or similar elements.

DETAILED DESCRIPTION OF THE PREFERRED EMBODIMENTS

Figure 1:
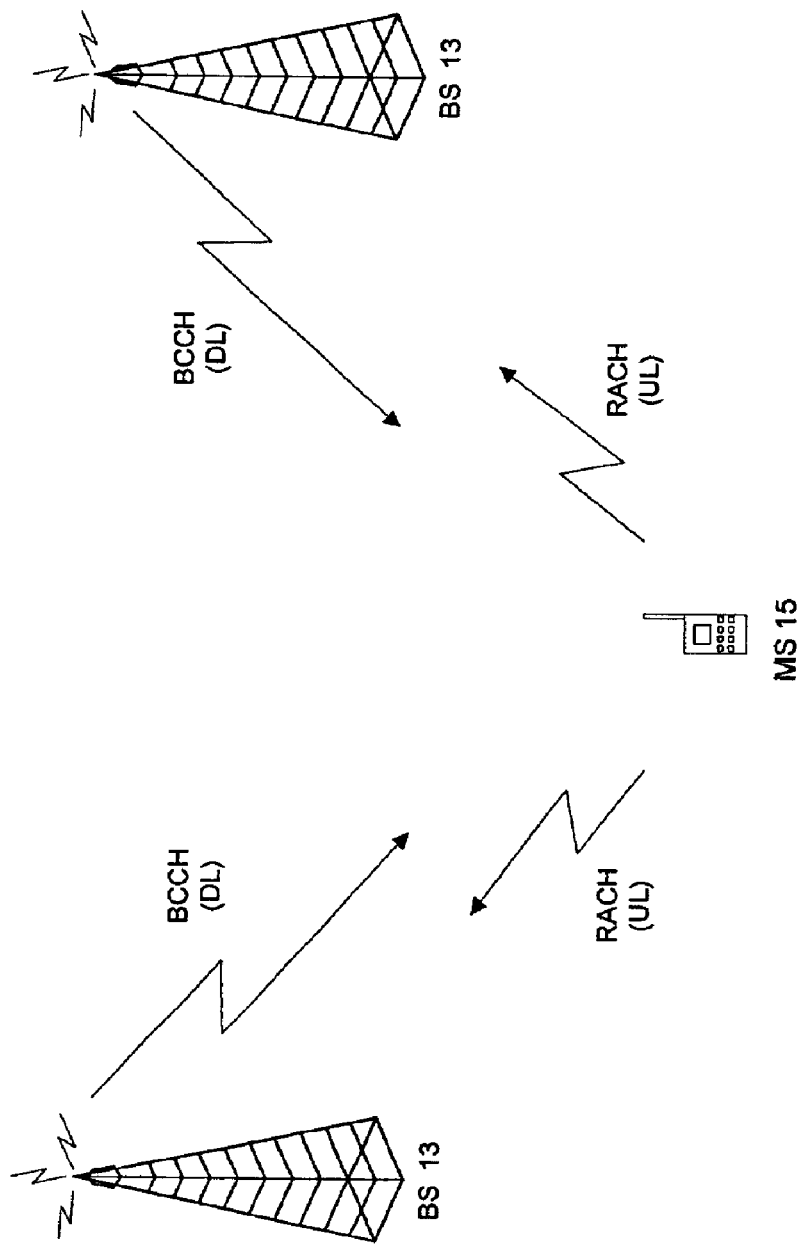
FIG. 1 is a block diagram of cellular type wireless communication system, which may provide a random-access packet data services.

The various inventive concepts disclosed herein relate to methods and system components for a wireless packet communication system, which implement initial power control during the access phase based on an initial power estimation of the transmitted random-access signal and subsequent fast open and closed-loop power control. Reference now is made in detail to the present preferred embodiments of the invention, examples of which are illustrated in the accompanying drawings, wherein like reference numerals indicate like elements throughout the several views.

In a preferred embodiment of a system implementing the invention (FIG. 1), the system comprises a plurality of base stations 13 and a plurality of mobile stations 15. Although not shown, a radio network controller (RNC) of the like provides two-way packet data communications to a wide area network, for example a packet-switched network. The RNC and the packet-switched provide the MS units 15 with two-way packet data communications services to enable communication to and from devices, such as an IP telephone, a personal computer (PC) and/or a server. Although the illustrated network may offer services over a number of different types of channels, for purposes of this discussion, the wireless system provides at least some packet data communication services using a plurality of random access channel (RACH) resources.

Each base station (BS) 13 has a BS-spread-spectrum transmitter and a BS-spread-spectrum receiver. Each mobile station (MS) 15 has an MS-spread-spectrum transmitter and an MS-spread-spectrum receiver. An exemplary spread-spectrum transceiver (combination of transmitter and receiver) usable in the BS or in the MSs appears in FIG. 10 and will be described later. The terms "mobile station" and "remote station" are used interchangeably to refer to one of the remote wireless devices. In most applications, the remote stations provide mobility, although in some services the remote device may remain stationary, e.g., in a wireless loop application. In this preferred embodiment, the wireless system provides packet data communication services using a plurality of Random Access Channels (RACH). Each RACH sub-channel through the system is an uplink transport channel for transmitting signals relating to requests for access to other uplink channel resources, such as an uplink access channel (AACH). Each AACH channel through the system is an uplink transport channel for transmitting variable size packets from a mobile station (MS) 15 to a base station (BS) 13, which utilizes a random access procedure to allow the mobile stations to use the RACH channel resources.

The combination of the MS spread-spectrum transmitter and the BS spread-spectrum receiver form a single high-capacity logical channel over the wireless air-link. The logical channel has a large processing gain at the demultiplexed sub-channel data-sequence level, for example 18 dB per symbol or 11.1 dB per bit. This single channel can be slotted for random access, broadcasting, paging and control, uplink and downlink data transport in a time-division-duplex (TDD) mode. When a user requests a high data-rate application, such as mobile video, all the sub-channels in a timeslot can be grouped together to serve a single mobile station. On the other hand, if there are many low data-rate applications, each single sub-channel in a timeslot can be assigned to a different mobile station.

Figure 2:
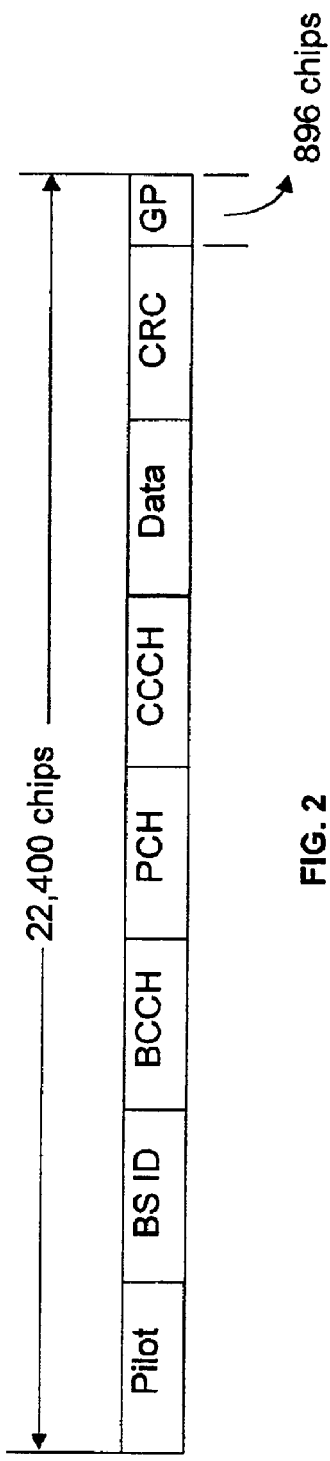
FIG. 2 is an illustration of the Signal Format of a BPCCH channel.

The base station transmits a broadcast channel (BCCH). In the embodiment, the BCCH may be part of a broadcast, paging and common-control channel (BPCCH), the format of which is shown in FIG. 2. The BPCCH, in the example, includes fields or slots that form the BCCH as well as a paging channel (PCH) and a control channel (CCCH). The fields of the BPCCH provide various parameters used for communication with the base station.

Upon power-up, an MS 15 searches for a transmission from any nearby BS 13. Upon successful synchronization with one or more BSs, the MS 15 receives the necessary system parameters from the continuously transmitted BS broadcast control channel (BCCH), which is broadcast by all base stations 13. Mobile stations which try to access the BS for the first time listen to the message on the BCCH channel that is embedded in the broadcast, paging and common-control channel (BPCCH) as shown in FIG. 2.

The broadcast message on the BCCH channel contains the information such as the available random-access preamble codes and their associated timeslots (i.e., the RACH sub-channels), ACK messages, etc. The receiver in the mobile station MS aligns its internal clock timing with the received BPCCH slot boundary. The MS establishes the timing with the BS and starts to demodulate the received messages. In such an embodiment, the mobile stations demodulate the BCCH broadcast messages using one of the broadcast random-access preamble codes and the associated timeslot.

Figure 4:
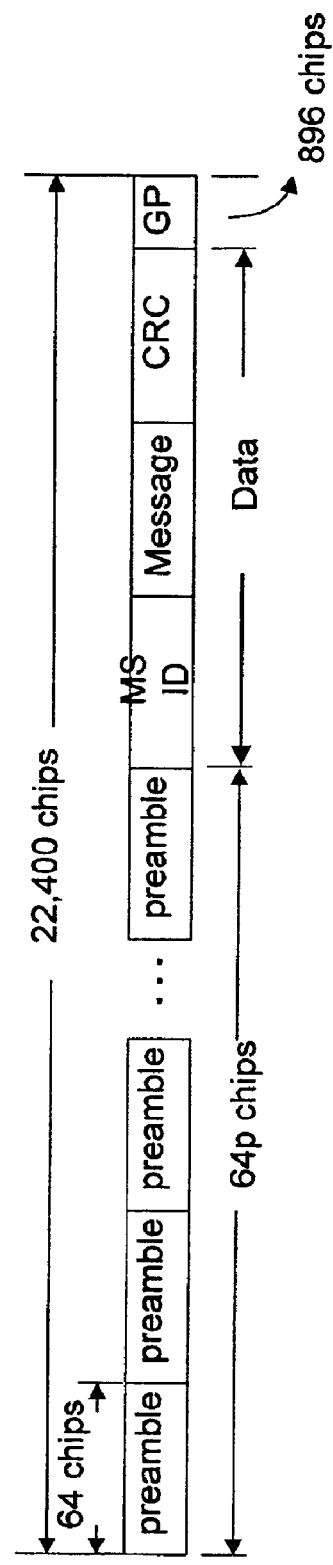
FIG. 4 is an illustration of the Signal Format of a random-access signal.
Figure 3:
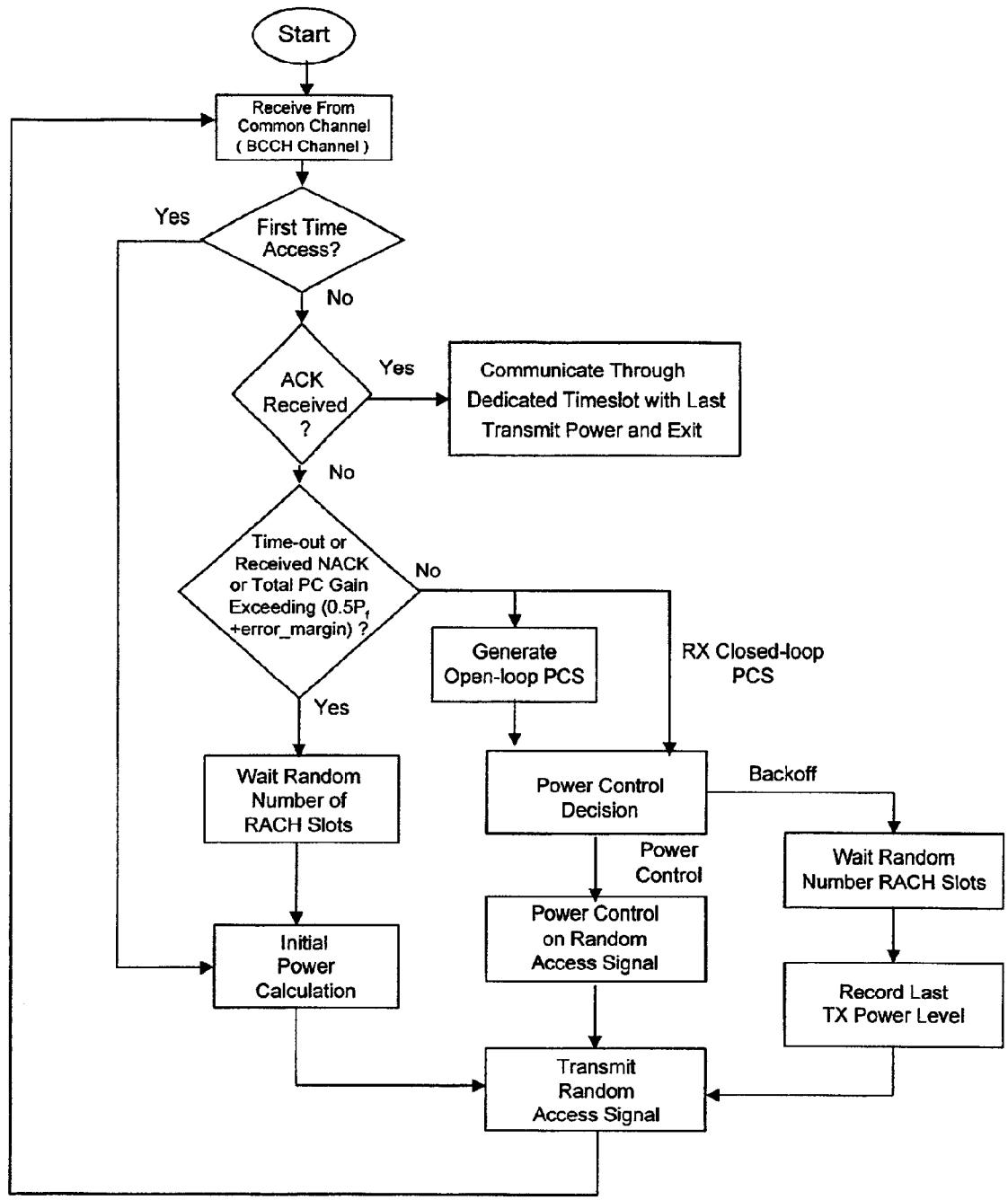
FIG. 3 is a high-level process diagram of a power-controlled random-access procedure in accord with one embodiment.

In the embodiment, the access attempt proceeds essentially as represented by the high-level flow diagram of FIG. 3 and as described below. When on of the MS stations needs to communicate, the MS selects an available preamble code sequence for one of the RACH sub-channels based on a random selection method, and then the MS transmits a random-access signal using the selected preamble code sequence. The random-access signal transmission consists of repeated preamble code sequence, preferably in orthogonal sequence, such as the modified Hadamard code sequence exclusive-or gated with the cell-site signature sequence with length of 64 chips. In a preferred embodiment shown in FIG. 4, the random-access signal may also consist of a data portion, comprising of a mobile station identification number (MS ID) field, a message field for carrying short messages (typically under 8 bytes) to the BS, and a cyclic-parity-check (CRC) code protecting the MS ID and the message. The data portion of the random-access signal is typically obtained by modulating the respective preamble sequence with the data bits using binary-phase-shift-keying (BPSK) type modulation. In this preferred embodiment, a guard period of 896 chips is appended at the end of the random-access signal. Each random-access signal is one slot length of the high-capacity channel, e.g. 250 $\mu$sec in length.

The MS transmits the first random-access signal with an initial power $P_i$. The MS may select the initial power $P_i$ by any of the various methods commonly known in the arts. In practice of the embodiments, the mobile station MS estimates power level $P_i$ for its first access attempt based on an analysis of one or more signals received from the base station, for example by measuring the signal strength of the base station transmission. Any known technique may be used for the analysis of the base station signal. A preferred technique is described below, by way of an example.

Figure 5:
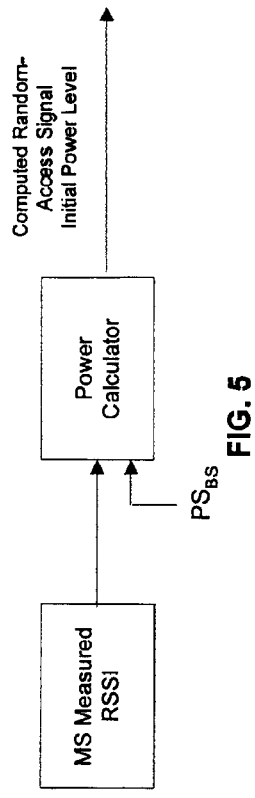
FIG. 5 is a graphical illustration of the algorithm of an MS transmitted random-access signal initial-power estimator.

Typically, $P_i$ is a function of any one of a BS broadcast transmit power symbol ($PS_{BS}$) from the BCCH channel and a measured received-signal-strength-indicator (RSSI) value of the BCCH channel by the MS, or a combination of both. FIG. 5 is a graphical illustration of an algorithm of an initial power estimator (IPE), usually implemented in a DSP (digital signal processor). In this particular algorithm, a RSSI block computes the RSSI value and outputs it to a power calculator, which also takes the received $PS_{BS}$ as input and calculates $P_i$. The $PS_{BS}$ is a two-bit field in a packet from the BCCH channel, which represents 4 levels of power p, which is the transmission power of the BS ($P_{actual}$) as a percentage of the maximum transmitted power ($P_{max}$) on the BCCH channel. The maximum power allowed by the FCC is used as a reference when $P_{max}$ on the BCCH channel is not available. $P_{max}$ can be programmed into the mobile station MS. An example of the mapping of p to $PS_{BS}$ is illustrated in Table 1

TABLE 1

| p = $P_{actual}$ as a percentage of $P_{max}$ | $PS_{BS}$ |
|---|---|
| 51% to 100% | 00 |
| 26% to 50% | 10 |
| 11% to 25% | 01 |
| 10% or under | 11 |

In this example, upon receipt of the BS transmitted $PS_{BS}$ symbol via the BCCH channel, the MS converts the $PS_{BS}$ symbol to a power control value p by reverse mapping using Table 1. The MS then calculates the MS received-signal-strength-indicator ($RSSI_{MS}$) of the received BCCH channel using this formula:

$$RSSI_{MS} = P_{max} + 10 \log 10(p) + G_{BS(\theta, \phi)} - L_{path} - L_{cable} + G_{MS(\theta, \phi)} \text{ (dBm)}$$

$G_{BS(\theta, \phi)}$ and $G_{MS(\theta, \phi)}$ are the BS transmitter gain and the MS receiver gain, both in units of dB in the spherical coordinate system, respectively. $L_{path}$ is the propagation loss between the BS and the MS and $L_{cable}$ is the cable loss in dB. NF is the noise figure in dB.

MS_datarate is the MS transmitted data rate, in bits per second (bps), and $P_{n(MS)}$ is the baseband noise power at the MS receiver, where $$P_{n(MS)} = 10 * \log_{10}(MS\_datarate) - 174 + NF \quad \text{(dBm)}$$

The signal to noise ratio measured at the MS receiver ($SNR_{MS}$) on the DL link can be obtained as the ratio of the received signal power over the noise power, $$SNR_{MS} = P_{max} + 10\log 10 (p) + G_{BS(\theta, \phi)} - L_{path} - L_{cable} + G_{MS(\theta, \phi)} - 10 * \log_{10}(MS\_datarate) + 174 - NF$$

In essence, during a TDD cycle the radio propagation channel remains fairly constant and the changes of antenna gain of both the transmitter and the receiver remain small. Therefore, the MS transmitted random-access power can be estimated given the MS received $SNR_{MS}$ and the difference in the SNR ratios required between the uplink and the downlink.

Assume the SNR ratio difference between the uplink and the downlink is γ dB and let $SNR_{BS}$ denotes the required SNR value at the BS receiver on the UL link, then $$SNR_{BS} = SNR_{MS} + \gamma$$
$$= P_{max} + 10\log 10(p) + G_{BS(\theta,\phi)} - L_{path} - L_{cable} + G_{MS(\theta,\phi)} -$$
$$10 * \log_{10}(MS\_datarate) + 174 - NF + \gamma$$

Since the $SNR_{BS}$ can also be computed from the MS transmitted random-access signal power ($P_{T(MS)}$), $$SNR_{BS} = P_{T(MS)} + G_{MS(\theta, \phi)} - L_{path} - L_{cable} + G_{BS(\theta, \phi)} - 10 * \log_{10}(BS\_datarate) + 174 - NF$$

Thus, the required MS transmitted random-access signal power can be computed as, $$P_{T(MS)} = P_{max} + 10 \log 10(p) + 10 \log_{10}(BS\_datarate/MS\_datarate) + \gamma$$

Further, assume η is the asymmetric loss between the two links from the uplink to downlink due to any non-linearity exists over the two links such as cable loss and noise figure for the power amplifier, etc., then the MS transmitted preamble power can be calculated as described and the Ms transmits its first RACH access attempt signal at that power level.

When the BS receives a random-access signal at an adequately detectable power level, it transmits back an acknowledgement (ACK), containing a signature that corresponds to the preamble code of the random-access signal. Upon receipt of the acknowledgement (ACK), the MS then transmits data and other information over an assigned uplink AACH channel, at its last transmission power (see FIG. 3).

Optionally, the BS may also transmit back a negative acknowledgement (NACK), indicating that the MS should back-off. Upon receipt of the NACK, the MS then waits for a certain number of slots before resuming the access procedure.

The inventive power control technique is particularly useful in a situation where the MS does not receive an acknowledgement signal of any kind. In such a situation, with the inventive technique, the MS will compute a composite power control command to determine its next step. Optionally, before such computation, if the MS has reached a maximum number of tries, it may wait for a certain number of slots before resuming the access procedure (see FIG. 4).

The composite power control command is based on an MS generated open-loop power-control symbol (OLPCS) and a received closed-loop power-control symbol (CLPCS) from the BS. The mobile station MS computes the OLPCS by subtracting a target MS SNR value ($SNR_{MS\_Target}$), which is a system design parameter representing the optimal SNR value, from the actual SNR value measured for the BCCH channel, and is represented in bits through mapping. From this computation, the MS generates a 2-bit power control symbol (PCS) for use as the OLPCS for its further power control computations, as will be discussed below.

When a mobile station selects a preamble code for use in its access attempt, the preamble code is specific to only one of the RACH sub-channels, and the mobile station sends its access signal using the selected sub-channel code as the preamble. However, the BS constantly monitors the sub-channel transmissions and computes a CLPCS value for each of the available sub-channels. The BS periodically broadcasts the CLPCS value of each available sub-channel to the entire cell.

In the embodiment, when the base station BS receives an access signal for a RACH sub-channel, from one or more of the mobile stations, the BS performs a power control symbol calculation similar to that used by the MS for the OLPCS. Essentially, the BS measures the SNR for the access signal for a RACH sub-channel and computes the difference between that SNR and a target SNR value. From this computation, the BS generates a 2-bit power control symbol (PCS) for use as the CLPCS for the respective RACH sub-channel. The BS includes this 2-bit PCS symbol in its next broadcast transmission over the BCCH. Of course those skilled in the art will recognize that either or both of the PCS symbols (OLCP, CLCP) may comprise more that the exemplary two bits of power control information.

Table 2 is an example of the mapping of the OLPCS or CLPCS, as used in the embodiment. In this example, the difference between the actual SNR and the target SNR is quantified into four levels, represented by four 2-bit power control symbol (PCS) values. If more levels are desired, the PCS can be more than 2-bits. PCS symbols "01" and "11" indicate that the actual transmission power is lower then desired (power-up required), while "10" and "00" indicate that the actual transmission power is higher then desired (power-down required).

TABLE 2

| SNR$_{actual}$ − SNR$_{target}$ (dB) | PCS |
|---|---|
| Larger than 3 | 00 |
| Larger than 0 but less than 3 | 10 |
| Larger than −2 but less than 0 | 01 |
| −3 or under | 11 |

Figure 7:
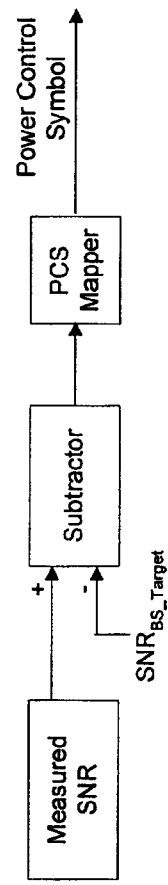
FIG. 7 is a graphical illustration of the algorithm of a base station power-control symbol generator.

FIG. 7 is a graphical illustration of the algorithm for generating the CLPCS by the BS. The measured SNR value on the BCCH channel is compared with the targeted SNR value (SNR$_{BS\_Target}$) by the subtractor block, which outputs the resultant difference signal into a PCS mapper implementing a mapping function similar to the one shown in Table 2.

As outlined above, the mobile station MS generates the OLPCS symbol. After its initial access signal transmission, the MS monitors the BCCH channel, essentially to look for and capture the CLPCS specific to the sub-channel corresponding to the preamble code previously selected by the MS. With the generated OLPCS and the received CLPCS for the sub-channel, the MS now has enough information to generate the composite power control command.

The possible commands include: (1) transmitting the next random-access signal at the same power; (2) transmitting the next random-access signal at the power of the last transmission +Δ, −Δ, +nΔ, −nΔ or a function of any of them; or (3) waiting for a certain number of slots before transmitting the next random-access signal at the same power (back-off). The Δ is an adjustable system parameter, which can be determined experimentally. The n is an integer. Typical values of Δ and n are 3 and 2, respectively. Those skilled in the art will recognize the other degrees of command and control are possible. For example, the possible values for the possible commands may include +xnΔ, −xnΔ, n being the integer multiple, if the system merits it.

In a nutshell, when both the CLPCS and the OLPCS indicate that more power is desired, the composite power control command will instruct the MS spread-spectrum transmitter to increase the transmission power of the next random-access signals by Δ or nΔ. Similarly, when both the CLPCS and the OLPCS indicate that less power is desired, the composite power control command will instruct the MS spread-spectrum transmitter to decrease the transmission power of the next random-access signals by Δ or nΔ. However, when there is a conflict between the CLPCS and the OLPCS, the composite power control command may instruct the MS spread-spectrum transmitter to transmit the next random-access signal at the same power or to back-off.

Figure 6:
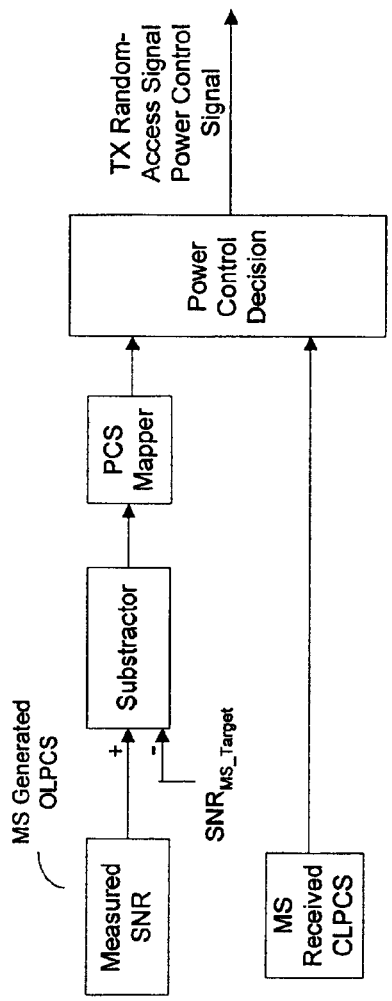
FIG. 6 is a graphical illustration of the algorithm of an MS power-control decision circuit.

FIG. 6 is a graphical illustration of the algorithm to generate the composite power control command. The power-control decision (PCD) circuit takes as inputs the OLPCS symbol generated from the MS receiver and the received CLPCS symbol generated by the base station receiver and outputs the composite power control command.

To better illustrate the inventive concepts, we will look into Table 3, whose composite power control commands are based on mapping of Table 2.

TABLE 3

| CLPCS | OLPCS | Composite Power Control Command |
|---|---|---|
| 11 | 11 | +nΔ |
| 00 | 00 | −nΔ |
| 01 | 01 | +Δ |

TABLE 3-continued

| CLPCS | OLPCS | Composite Power Control Command |
|---|---|---|
| 11 | 01 | +Δ |
| 01 | 11 | +Δ or +Max(nΔ − PPCA(t − t0), Δ) |
| 00 | 10 | −Δ |
| 10 | 00 | −Δ |
| 10 | 10 | −Δ |
| 01 | 00 | No change or −Δ |
| 01 | 10 | No change or −Δ |
| 11 | 00 | No change or −Δ |
| 11 | 10 | No change or −Δ |
| 00 | 11 | Back-off and resume at no change in power |
| 10 | 11 | Back-off and resume at no change in power |
| 00 | 01 | Back-off and resume with +Δ in power |
| 10 | 01 | Back-off and resume with +Δ in power |
| — | | No change or based on OLPCS alone |

According to Table 3, when both the CLPCS and OLPCS symbols equal "11", both measurements indicate that the transmission power is more than 3 dB lower than the target SNR. Therefore, the PCD circuit will command the MS to increase the transmission power in its next random-access transmission signal by nΔ dB. Likewise, when both the CLPCS and OLPCS symbols equal "00", these measurements indicate that the transmission power is more than 3 dB higher than the target SNR. Therefore, the PCD circuit will command the MS spread-spectrum transmitter to decrease the transmission power for its next random-access transmission signal by nΔ dB. The "initial" or "first" attempt here is the immediately preceding attempt, which may have been an actual start-up based only on the power estimate or an intervening attempt based on an earlier composite power command.

When the CLPCS is "01" or "11" and the OLPCS symbol is "01", the PCD circuit will command the MS to increase transmission power by only Δ dB. Similarly, when the CLPCS is "00" or "10" and the OLPCS symbol is "10," or when the CLPCS symbol is "10" and the OLPCS is "00", the PCD circuit will command the MS spread-spectrum transmitter to increase transmission power by only Δ dB, to balance the power among all the RACH sub-channels.

When the CLPCS is "01" or "11" and the OLPCS is "00" or "10", there is a contradiction between the measurements by the two stations (BS and MS). The BS thinks the MS is not transmitting enough power, whereas the MS thinks it is transmitting too much power. The PCD circuit will then command the MS spread-spectrum transmitter to transmit the next random-access signal at the same power or at a decreased power depending on the one or more of the previous composite power control commands. For example, if the last command was to decrease power by Δ, it is possible that this MS was previously in a fade and is just coming out of the fade. In this situation, it is better for the MS to wait out and transmit at the same amount of power as before and not to introduce any unnecessary interference to the access channel. However, if there was no power-down command previously, then the PCD circuit will command the MS spread-spectrum transmitter to reduce transmission power by Δ dB. How far back the power control commands should be taken into consideration in the computation of the new power control command is a design specific issue, and the inventive concepts should cover all variations thereof.

The net cumulative power control gain on the MS transmitted random-access signal over the entire access duration should not exceed a system designed cap, e.g., half of the average fading depth ($P_f$) plus the error margin in the initial power estimation. The fading depth can be measured from the radio channel in which the high-capacity system operates. In addition, the MS transmitted random-access signal power should never exceed the maximum allowed value for each service class.

Another contradiction in measurements arises when the CLPCS is "00" or "10" and the OLPCS is "11". In this situation, the BS thinks the MS is transmitting too much power, whereas the MS thinks it is absolutely transmitting not enough power. This may happen if the mobile station is just getting into a fade situation. The PCD circuit will instruct the MS spread-spectrum transmitter to cease transmission for a certain number of slots (back-off) immediately and resume transmission later at the current power level.

Yet another contradiction in measurements arises when the CLPCS is "00" or "10" and the OLPCS is "01". In this situation, the BS thinks the MS is transmitting too much power, but the MS thinks it is may be transmitting not enough power. This situation may arise if is a collision of multiple access attempts on this one RACH sub-channel, and this particular MS is losing in the contention. The CLPCS measurement could be based on the colliding mobile stations, and the BS has already received the strongest contending mobile station's random-access signal. In this case, the MS must immediately cease its transmission for a certain number of slots (back-off), so that it does not add any unnecessary interference to the access channel. When the MS resumes access, the transmission of its next random-access signal will be increased by $\Delta$ dB to ensure fast channel-access for the subsequent random-access attempt.

The back-off commanded by the inventive power-control method provides a mechanism to resolve collision between mobile stations. Optimally, the average back-off time should be no less than the average fade duration of the radio channel to ensure that the same MS will not fall back to a fade again in the subsequent random-access attempt. This approach shortens the average time for gaining the access to the BS when a losing MS is in the active channel-access state waiting for the actual time-out mechanism to kick in.

There are times that the CLPCS symbol cannot be received with a reasonable probability, as indicated by the "- -" in Table 3. Then, the PCD circuit will commence no power-control on the next random-access signal. Instead, the PCD circuit will command the power-control by the OLPCS power-control alone when the MS is being power-controlled for the first time.

All the aforementioned random-access signal power-control cases assume that the MS has not received either an ACK or a NACK message on the BCCH channel and the time-out timer has not expire yet.

Upon a successful access attempt (received ACK message), the MS and BS will begin communicating on an uplink access channel (ACCH) channel and a dedicated forward access channel (FACH) channel, respectively. Depending on the network load and the service requested by the MS, more than one ACCH channel or FACH channel may be assigned. Assignment information is broadcast down to the MS on the common-control channel (CCCH) along with the timing information of the channels. This access protocol is a random access with channel reservation, and the overall power-controlled random-access scheme is illustrated in FIG. 3.

The same invented power-control method can be used to power control the data transmission phase. The BS can apply the method to set the appropriate transmitted power level to the MS on the FACH channel. The MS, which gained the access to the BS, can also continue using this method to control transmission power on the ACCH channel. By controlling the power on both the BS and MS on the respective ACCH and FACH channel, co-channel interference can be minimized.

Figure 8:
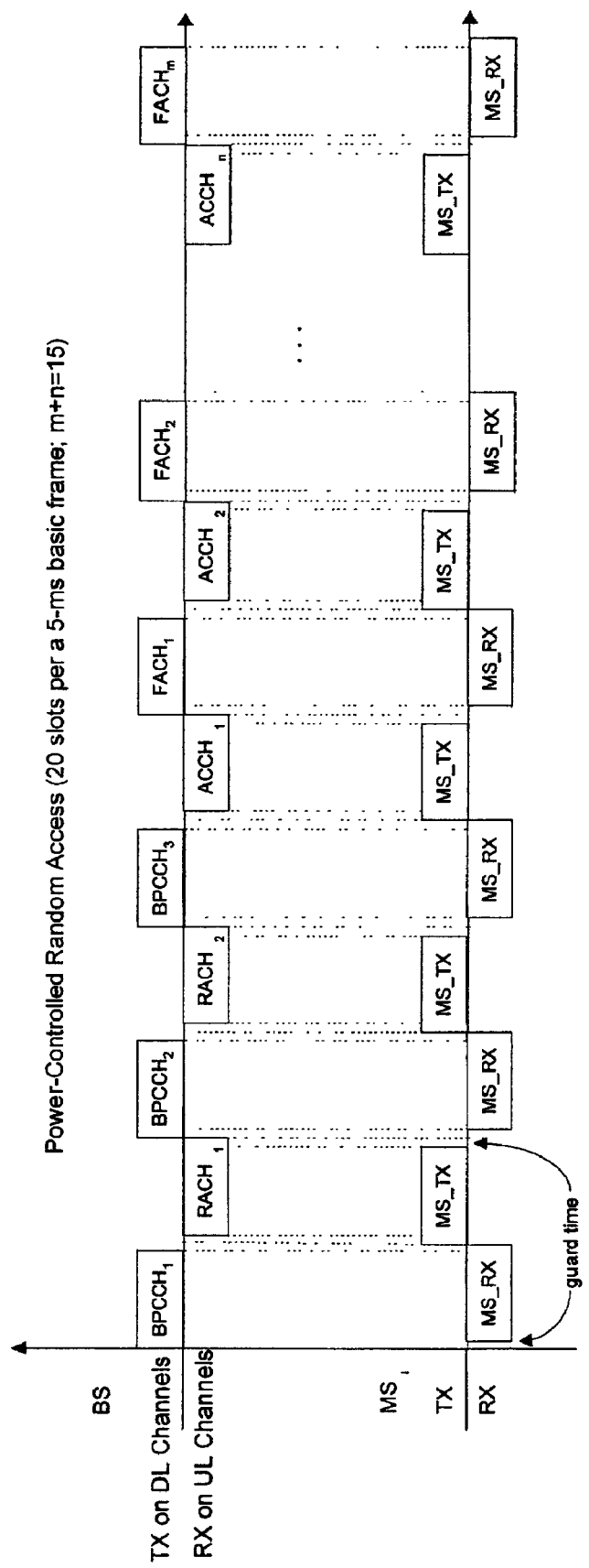
FIG. 8 is a block diagram of the power-controlled random-access scheme.

FIG. 8 is an illustration of a 5-ms basic frame (20 slots) of the packet-access scheme for this high-capacity system. In this example, only five slots of the twenty slots are assigned for access attempt: 2 RACH slots and 3 BPCCH slots are located next to each other. If the BS cannot determine the identity of the MS trying to gain access to a specific RACH sub-channel over two consecutive BPCCH slots, it will tag that sub-channel as "available" so that a contending MS can start to back-off immediately. This provides yet another mechanism for resolving collisions between mobile stations, which is a time-out mechanism provided by the BS to free the access-channel resource. The time-out time is a system parameter that can be determined to meet certain network and traffic load requirements.

Figure 9:
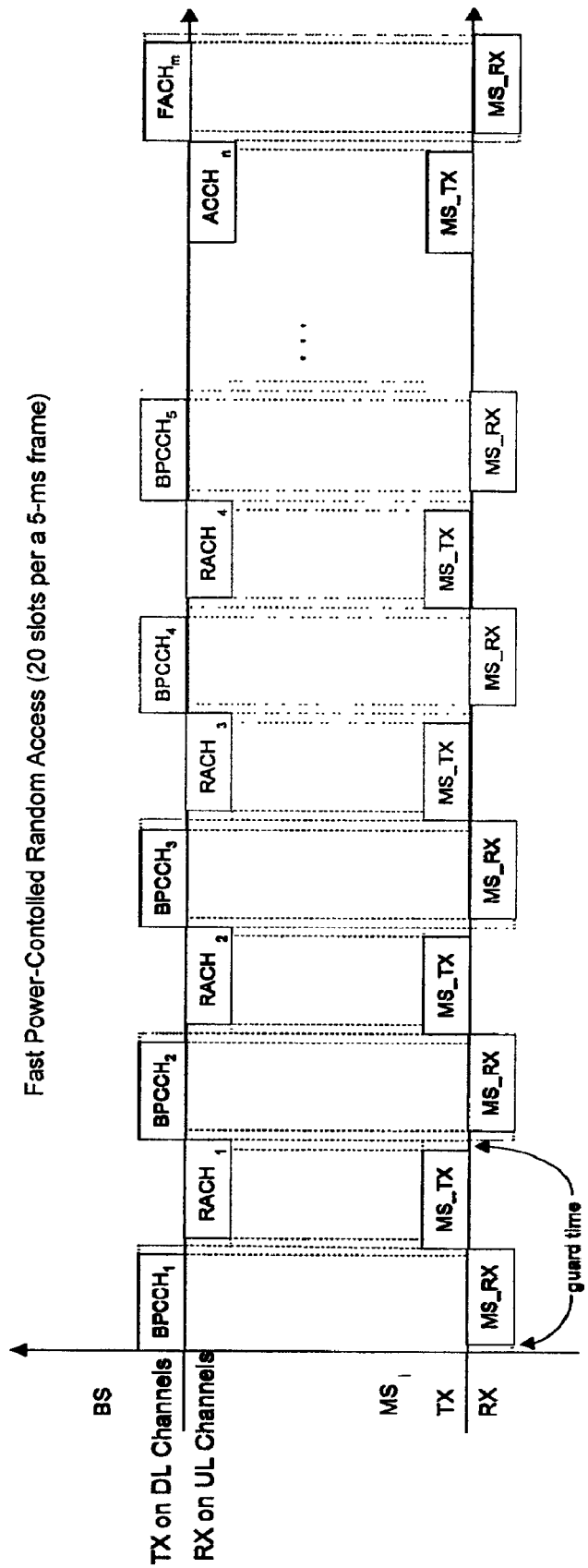
FIG. 9 is a block diagram of the fast power-controlled random-access scheme.

If the network load is light, the BS can broadcast a change in the frame format to all mobile stations over a control channel to achieve fast power-controlled random access. For example, slots for access attempt can be concentrated in a single frame over a two-frame period, as shown in FIG. 9. Under this configuration, more pairs of RACH/BPCCH are placed right after the pair of $RACH_2/BPCCH_3$ so that more MS transceivers can have access-granted over a one-frame period. At the frame immediately right after that shown, all slots will be for traffic bearing ACCHs and FACHs. This method of changing frame format allows the network to dynamically allocate channel resources.

To ensure a complete understanding of the invention, it may be helpful to consider the structure of preferred embodiments of the base station transceivers and the mobile station transceivers, particularly for use in a preferred implementation in a fourth generation (4G) type wireless network.

Figure 10:
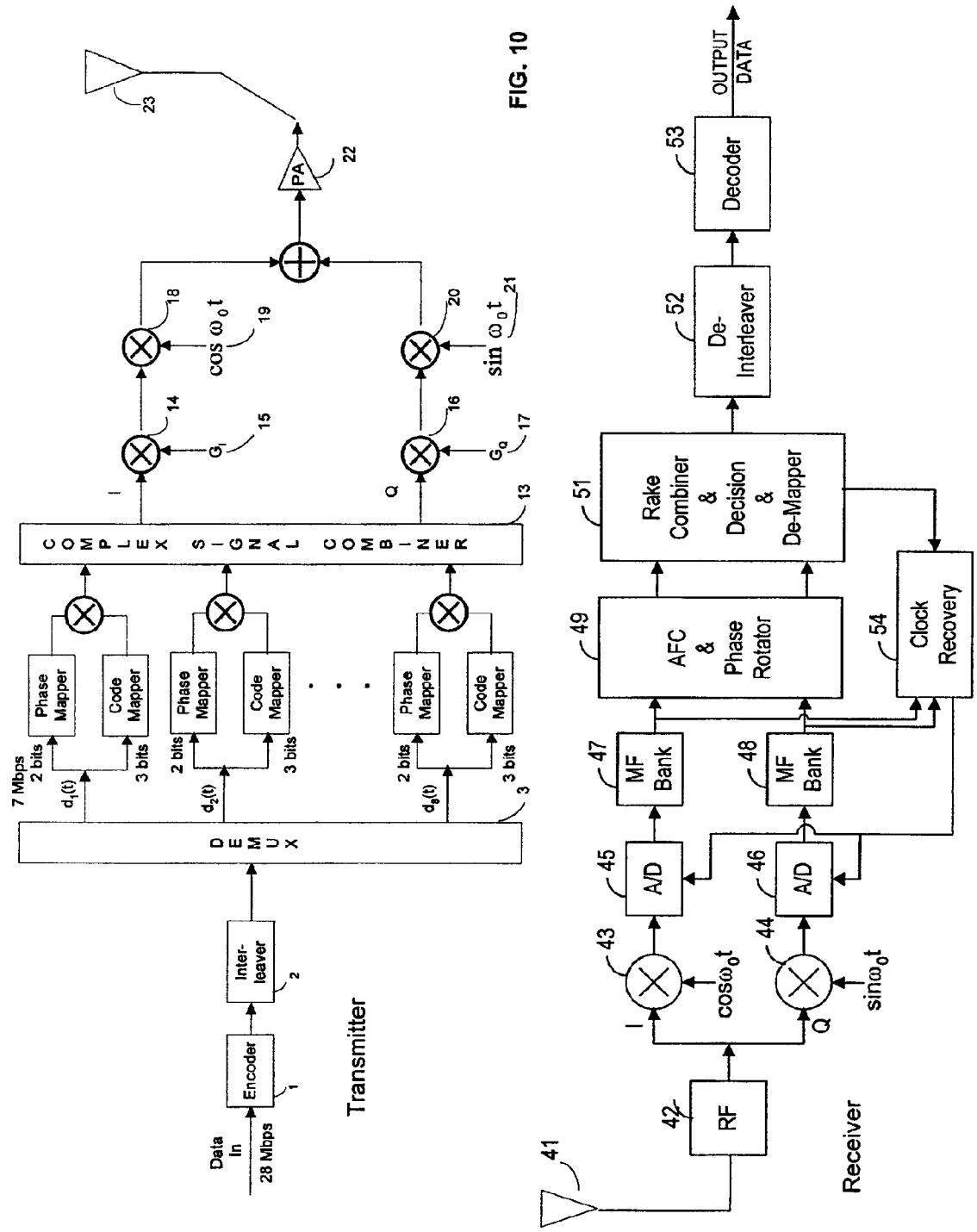
FIG. 10 is functional block diagram of a multi-channel MS spread-spectrum transceiver.

FIG. 10 shows an embodiment of an MS spread-spectrum transmitter and an MS spread-spectrum receiver, essentially in the form of a base-band processor for performing the PHY layer transceiver functions for a mobile station. The MS spread-spectrum transmitter and the MS spread-spectrum receiver are located at one of the remote or mobile stations (MS) 15, shown in FIG. 1. An implementation of a base station (BS) 13 would utilize a similar combination of a transmitter and receiver, although a typical base station likely would include a number of such transceivers.

The MS spread-spectrum transmitter consists of an encoder 1, which receives input information data at 28 Mbps. The encoder 1 performs error correction encoding, for example by application of a rate-½ convolutional code. The resultant encoded data at 56 Mbps is applied to an interleaver 2. At the output of the interleaver 2, the data stream is divided into a number of sub-channel data streams by a de-multiplexer 3. The preferred embodiments utilize 8 sub-channels, therefore the 56 Mbps interleaved and encoded data stream is split into 8 sub-channel data sequences, each at a 7 Mbps rate. For each sub-channel, each five bits of new input data (encoded, interleaved and sub-divided) is used for mapping by a phase mapper and a code mapper. As noted, the preferred embodiments have 8 sub-channels, therefore the transmitter in the system includes 8 code mappers and 8 phase mappers. Within each code or phase mapper, three bits of the sub-channel data are mapped onto one of 8 distinct 64-chip length orthogonal codes unique to the respective sub-channel. The other 2 data bits are mapped to one of 4 distinct quadrature-phase-shift-keying (QPSK) phasors. Logically speaking, the QPSK phasor signal is used to modulate the spreading code output signal of the particular sub-channel.

A complex signal combiner 13 algebraically combines the in-phase and quadrature components of the spread-spectrum channels to form an in-phase (I) multi-channel signal and a quadrature (Q) multi-channel signal. In the preferred embodiments, each spread-spectrum sub-channel is identified with a set of distinct spreading codes and a set of distinct phasors. These spread-spectrum sub-channels are combined in-phase and quadrature, and the combined signals are spread by a cell-site specific signature-sequence for identifying users in different cells. For this purpose multiplier 14 modulates the in-phase (I) multi-channel signal by a cell-site specific signature-sequence, for example in the form of an extended Gold code sequence $G_I$ 15. Similarly, a multiplier 16 modulates the quadrature (Q) multi-channel signal by the cell-site specific signature-sequence $G_Q$ 17. The Gold codes are the signature sequences used for cell identification. Multipliers 18, 20 modulate carrier-frequency signals 19, 21 generated by a local oscillator to shift the complex signals to a radio frequency. Specifically, multiplier 18 modulates the spread-spectrum signal from multiplier 14 with the local oscillator signal $\cos(\omega_o t)$ 19; and the multiplier 20 modulates the spread-spectrum signal with the local oscillator signal $\sin(\omega_o t)$ 21. The two local oscillator signals have the same frequency but are shifted 90° apart in phase. The in-phase and quadrature RF modulated signals are summed and amplified by a power amplifier 22 and/or other circuitry as is well known in the art for transmitting the combined signal over a communications channel via an antenna 23.

The receiver includes an antenna 41 for receiving the spread-spectrum signal transmitted over the air-link. A RF front-end system 42 provides low noise amplification from the antenna 41. The RF front-end system 42 supplies the channel signal to two translating devices 43 and 44. One or more local oscillators generate proper carrier-frequency signals and supply a $\cos(\omega_o t)$ signal to the device 43 and supply a $\sin(\omega_o t)$ signal to the device 44. The translating device 43 multiplies the amplified over-the-air channel signal by the $\cos(\omega_o t)$ signal; and the translating device 44 multiplies the amplified over-the-air channel signal by the $\sin(\omega_o t)$ signal. The translating devices 43 and 44 translate the received multi-channel spread-spectrum signal from the carrier frequency to the baseband. The translating device 43 supplies the spread-spectrum signal at the baseband to an analog to digital (A/D) converter 45. Similarly, the translating device 44 supplies the spread-spectrum signal at the baseband to an analog to digital (A/D) converter 46. Each of the digital output signals is applied to a matched filter (MF) bank 47 or 48. Each matched filter bank 47, 48 utilizes two quadrant sub-matrices of the matrix of potential spreading codes as reference signals, in this case to recognize the 64 spreading codes, and correlate the signal on its input to identify the most likely match. In this manner, each MF filter bank 47, 48 selects the most probably transmitted code sequence for the respective channel.

The signals from the MF banks 47 and 48 are supplied in parallel to a processor 49, which performs automatic frequency correction (AFC) and phase rotation, and the outputs thereof are processed through a rake combiner and decision/demapper circuit 51, to recover and re-map the chip sequence signals to the original data values. The data values for the I and Q channels also are multiplexed together to form a data stream at 56 Mbps. This detected data stream is applied to a deinterleaver 52. The deinterleaver 52 reverses the interleaving performed by interleaver element 2 at the transmitter. A decoder 53 performs forward error correction on the stream output from the deinterleaver 52, to correct errors caused by the communication over the air-link and thus recover the original input data stream (at 28 Mbps). The receiver section also includes a clock recovery circuit 54, for controlling certain timing operations of the receiver, particularly the A/D conversions.

As noted earlier, the invention is applicable to other channel access technologies. The invention admits of a wide range of variations and applications. For example, the preferred embodiments involve application to CDMA type wireless communications. However, the invention may find application to packet data communications in other types of digital wireless networks. As an example, the transceivers in the embodiment are of the type disclosed in U.S. Pat. No. 6,324,209 entitled "Multi-channel spread spectrum system" by Don Li and Gang Yang, which operate essentially as described above. The inventive concepts also are applicable in a wide range of other wireless packet data communication systems, for example, including systems using transceivers similar to those used for common packet channel communications in U.S. Pat. No. 6,169,759 to Kanterakis et al.

While the foregoing has described what are considered to be the best mode and/or other preferred embodiments, it is understood that various modifications may be made therein and that the invention or inventions disclosed herein may be implemented in various forms and embodiments, and that they may be applied in numerous applications, only some of which have been described herein. It is intended by the following claims to claim any and all modifications and variations that fall within the true scope of the inventive concepts.

What is claimed is:

1. In a code-division-multiple-access (CDMA) system employing spread-spectrum modulation comprising a base station (BS) comprising a BS-spread-spectrum transmitter and a BS-spread-spectrum receiver, and a plurality of mobile stations, each mobile station (MS) comprising a MS-spread-spectrum transmitter and a MS-spread-spectrum receiver, a method comprising the steps of:

computing an initial power estimate for a first access attempt by one of the mobile stations;

transmitting from the MS-spread-spectrum transmitter of the one mobile station a spread-spectrum signal signifying a first attempt to utilize a random access channel, at a power level based on the initial power estimate;

receiving one or more access attempt signals relating to the random access channel at the BS-spread-spectrum receiver;

measuring the one or more access attempt signals received by the BS-spread-spectrum receiver;

computing a closed loop power control symbol specifying an extent that power of the measured one or more received access attempt signals differs from a target power;

broadcasting a control message containing the closed loop power control symbol from the BS-spread-spectrum receiver; and if the MS-spread-spectrum receiver of the one mobile station does not detect an acknowledgement responsive to the first access attempt of the one mobile station:

(a) receiving the broadcast control message and obtaining the closed loop power control symbol;

(b) processing a signal received from the base station in the MS-spread-spectrum receiver of the one mobile station to produce an open loop power control symbol specifying an extent of a change in power for uplink transmissions regarding the random access channel;

(c) generating a power control command as a function of both the closed loop power control symbol and the open loop power control symbol; and (d) transmitting from the MS-spread-spectrum transmitter of the one mobile station a spread-spectrum signal signifying a second attempt to utilize the random access channel, at a power level based on the power control command.

2. The method as in claim 1, wherein each of the power control symbols comprises a multi-bit symbol.

3. The method as in claim 1, wherein the one mobile station delays the step of transmitting the spread-spectrum signal signifying the second attempt to utilize the random access channel by a predetermined amount, in response to at least one possible combination of values of the closed loop power control symbol and the open loop power control symbol.

4. The method as in claim 1, wherein:

the step of measuring the one or more access attempt signals comprises measuring a signal to noise ratio of the one or more access attempt signals at the BS-spread-spectrum receiver; and the step of computing the closed loop power control symbol comprises computing a difference between the measured signal to noise ratio and a target signal to noise ratio and mapping the difference to a corresponding multi-bit symbol value.

5. The method of claim 1, wherein the step of processing the signal received from the base station to produce the open loop power control symbol comprises:

determining a signal to noise ratio of the signal received from the base station; and computing a difference between the determined signal to noise ratio and a target signal to noise ratio; and mapping the difference to a corresponding multi-bit symbol value.

6. The method as in claim 1, wherein the step of computing the initial power estimate comprises:

receiving in the MS-spread-spectrum receiver of the one mobile station, a broadcast spread spectrum signal from the base station;

measuring the received broadcast spread spectrum signal; and computing the initial power estimate based on the measurement of the received broadcast spread spectrum signal.

7. The method as in claim 1, further comprising communicating between the mobile station and the base station via an uplink access channel (ACCH) channel and a dedicated forward access channel (FACH) channel, in response to a successful one of the attempts to utilize the random access channel.

8. A method of attempting access to a random access channel serviced through a base station of a code-division-multiple-access (CDMA) wireless communication system, the method comprising:

transmitting a spread-spectrum signal signifying a first attempt to utilize the random access channel, from a mobile station, at a predetermined power level; and if the mobile station does not detect an acknowledgement responsive to the first attempt:

receiving a broadcast control message from the base station containing a closed loop power control symbol specifying an extent that power of a signal received at the base station differs from a target power;

processing a signal received from the base station to produce an open loop power control symbol specifying an extent of a change in power for uplink transmissions regarding the random access channel;

generating a power control command as a function of both the closed loop power control symbol and the open loop power control symbol; and transmitting from the mobile station a spread-spectrum signal signifying a second attempt to utilize the random access channel in a manner controlled as a function of the power control command.

9. The method of claim 8, wherein each of the signals signifying one of the attempts to utilize the random access channel comprises a preamble code sequence associated with the random access channel and a data message.

10. The method of claim 8, wherein:

the power control command can specify different levels of increase or decrease in transmission power for control of the signal transmission signifying the second attempt; and the power control command can specify a back-off by the mobile station.

11. A code-division-multiple-access (CDMA) wireless remote station, comprising:

a CDMA transmitter;

a CDMA receiver; and a controller coupled to the CDMA receiver for responding to signals received via the CDMA receiver and coupled for controlling the CDMA transmitter, such that in operation the CDMA wireless remote station is for performing the following steps:

transmitting a spread-spectrum signal signifying a first attempt to utilize a random access channel, from the wireless remote station, at a predetermined power level; and if the wireless remote station does not detect an acknowledgement responsive to the first attempt:

receiving a broadcast control message from a base station containing a closed loop power control symbol specifying an extent that power of a signal received at the base station differs from a target power;

processing a signal received from the base station to produce an open loop power control symbol specifying an extent of a change in power for uplink transmissions regarding the random access channel;

generating a power control command as a function of both the closed loop power control symbol and the open loop power control symbol; and transmitting from the wireless remote station a spread-spectrum signal signifying a second attempt to utilize the random access channel in a manner controlled by the power control command.

12. The CDMA wireless remote station as in claim 11, wherein the controller comprises means for mapping combinations of the open loop and closed loop power control symbols into values of the power control command.

13. The CDMA wireless remote station as in claim 12, wherein:

each of the power control symbols comprises a multi-bit value, and the means for mapping maps the combinations of multi-bit values for the open loop and closed loop power control symbols into values of the power control command which can selectively specify different levels of increase and decrease in transmission power and a back-off by the wireless remote station.

14. The CDMA wireless remote station as in claim 11, wherein the transmitting of the signal signifying the first attempt involves computing an initial power estimate and the predetermined power level corresponds to the initial power estimate.

15. The CDMA wireless remote station as in claim 14, wherein the controller comprises means for computing the initial power estimate in response to one or both of: (1) a broadcast transmit power symbol received in a broadcast signal from the base station detected by the CDMA receiver, and (2) a measured received-signal-strength-indicator value determined in response to the broadcast signal from the base station detected by the CDMA receiver.

16. The CDMA wireless remote station as in claim 11, wherein the controller comprises means for computing a multi-bit value for the open loop power control symbol as a function of a signal to noise ratio determined for a broadcast signal from the base station detected by the CDMA receiver.

* * * * *